United States Patent [19]
Giardina

[11] Patent Number: 4,720,847
[45] Date of Patent: Jan. 19, 1988

[54] ANSWERING DEVICE

[76] Inventor: Joseph J. Giardina, 32 Judson, Apt. 14B, Edison, N.J. 08837

[21] Appl. No.: 852,621

[22] Filed: Apr. 16, 1986

[51] Int. Cl.⁴ .............................................. H04M 1/64
[52] U.S. Cl. ...................................... 379/88; 379/387; 379/140
[58] Field of Search ...................... 379/71, 72, 82, 266, 379/309, 88, 89, 67, 113, 140, 141, 70, 74, 387

[56] References Cited
U.S. PATENT DOCUMENTS

| | | | |
|---|---|---|---|
| 3,288,935 | 11/1966 | Hepner | 379/140 |
| 4,005,271 | 1/1977 | Urayama | 379/74 |
| 4,066,847 | 1/1978 | Giordano | 379/82 |
| 4,436,959 | 3/1984 | Nakatsuyama et al. | 379/73 |
| 4,500,753 | 2/1985 | Plunkett, Jr. | 379/70 |
| 4,547,630 | 10/1985 | Giammarrusco | 379/89 |

Primary Examiner—James L. Dwyer
Attorney, Agent, or Firm—Thomas L. Adams

[57] ABSTRACT

An answering device for answering callers on at least one telephone line, has a ring detector. The ring detector is adapted to be coupled to the telephone line for sensing an incoming call thereon. The detector can provide in response to this incoming call a ring signal. Also included is a central processor coupled to the ring detector. The processor can provide a command signal that varies according to a predetermined sequence, in response to successive occurrences of the ring signal. The answering device also has a voice synthesizer coupled to the central processor. The voice synthesizer is adapted to be coupled to the telephone line for providing thereon a speech signal waveform in response to the command signal.

16 Claims, 7 Drawing Figures

ANSWERING DEVICE

BACKGROUND OF THE INVENTION

The present invention relates to answering devices and, in particular, to equipment providing a predetermined message to a plurality of callers.

Known answering machines detect a ring on a telephone line to activate an answering device. A common response is to apply a predetermined recorded message to that line. These systems however, have no ability to adapt the message according to the sequence of callers.

There are commercially available speech synthesizers which are in the form of a microcomputer having a read only memory. This read only memory contains information necessary for the microcomputer to produce synthesized speech.

It is a common promotional technique for radio stations and other broadcasters to offer prizes to the caller who calls first, second, one-hundredth, etc. These contests are performed with telephone operators who quickly answer the call with a prescribed message such as: "you are the third caller." Obviously this process can be time consuming, especially when many callers respond. Moreover, it is necessary even after receipt of the winning call, to inform subsequent callers that they called too late.

Accordingly, there is a need for an answering device which is able to provide synthesized speech and to provide different messages to different callers in a predetermined sequence.

SUMMARY OF THE INVENTION

In accordance with the illustrative embodiments demonstrating features and advantages of the present invention, there is provided an answering device for answering callers on at least one telephone line. The answering device has a ring means adapted to be coupled to the telephone line for sensing an incoming call thereon. The ring means can provide in response to the incoming call, a ring signal. Also included is a central means coupled to the ring means for providing a command signal varying according to a predetermined sequence, in response to succesive occurrences of the ring signal. The answering device also has a voice means coupled to the central means and adapted to be coupled to the telephone line for providing thereon a speech signal waveform, in response to the command signal.

By employing apparatus of the forgoing type a highly desirable answering device is acheived. This answering device can be advantageously used in a telephone calling contest to identify the caller who calls at the proper time; that is, who calls first, second, or otherwise.

In a preferred embodiment, a microcomputer has an input which is used to poll a plurality of telephone lines and to stop polling when one is detected as ringing. The ringing telephone line is then connected to a speech synthesizer to transmit a message advising the caller of his position in the sequence of callers. Thereafter the polling continues until receipt of the call from the caller who called in the right position in the sequence. This caller is then switched by a separate switching matrix to a conventional telephone set. The operator of the contest can then answer the telephone in the usual fashion.

In this preferred embodiment, a microcomputer operates by first sensing the count dialed into thumb-wheel switches, which count indicates the number of the caller who will be designated a winner. The microprocessor also issues a trigger pulse for each caller answered so that a counter/display can indicate how far the count has proceeded.

The microprocessor can also directly program the speech synthesizer, which is itself a microprocessor. The speech processor is designed to have several standard phrases that can be combined to form sentences. For example, prior to selecting a winner the speech processor can recite, "you are caller number . . . ," followed by the caller's calling position.

Preferably the system is structured so that the input-/output stages are expandable. In a basic embodiment the number of lines monitored can be between one to ten lines. However, this number of monitored lines can be expanded beyond ten. Also, in some embodiments the speech synthesizer can be customized by producing synthesized speech from a recording of a particular personality.

BRIEF DESCRIPTION OF THE DRAWING

The above brief description as well as other features and advantages of the present invention will be more fully appreciated by reference to the following detailed description of a presently preferred but nonetheless illustrative embodiments in accordance with the present invention when taken in conjunction with the accompanying drawings, wherein.

DETAILED DESCRIPTION OF THE PREFERRED EMBODIMENT

Figure 1:
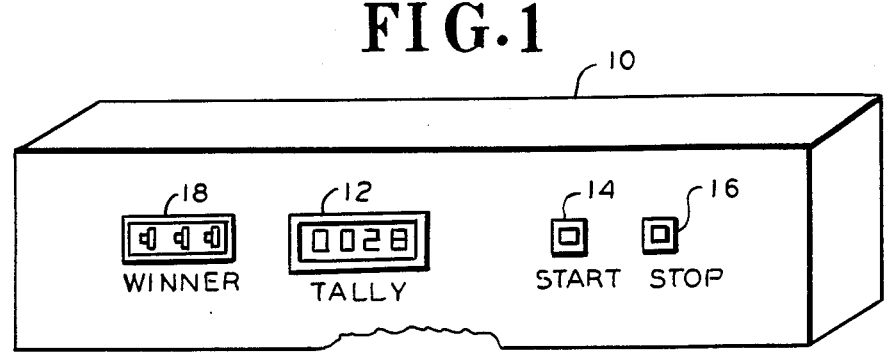
FIG. 1 is a front perspective view showing an answering device according to the principles of the present invention.

Referring to FIG. 1, it shows an answering device 10 in the form of a case having on its front panel a count display 12 in the form of four LED (light emitting diode) devices. Each of these devices may be a seven segment display, although clearly other displays will operate satisfactorily. Also shown is a start switch 14 and stop switch 16, both being pushbutton, momentary contact switches. The number of the winning caller can be dialed onto a trio of thumbwheel selectors 18, to provide, as described hereinafter, binary coded decimal signals.

Figure 2:
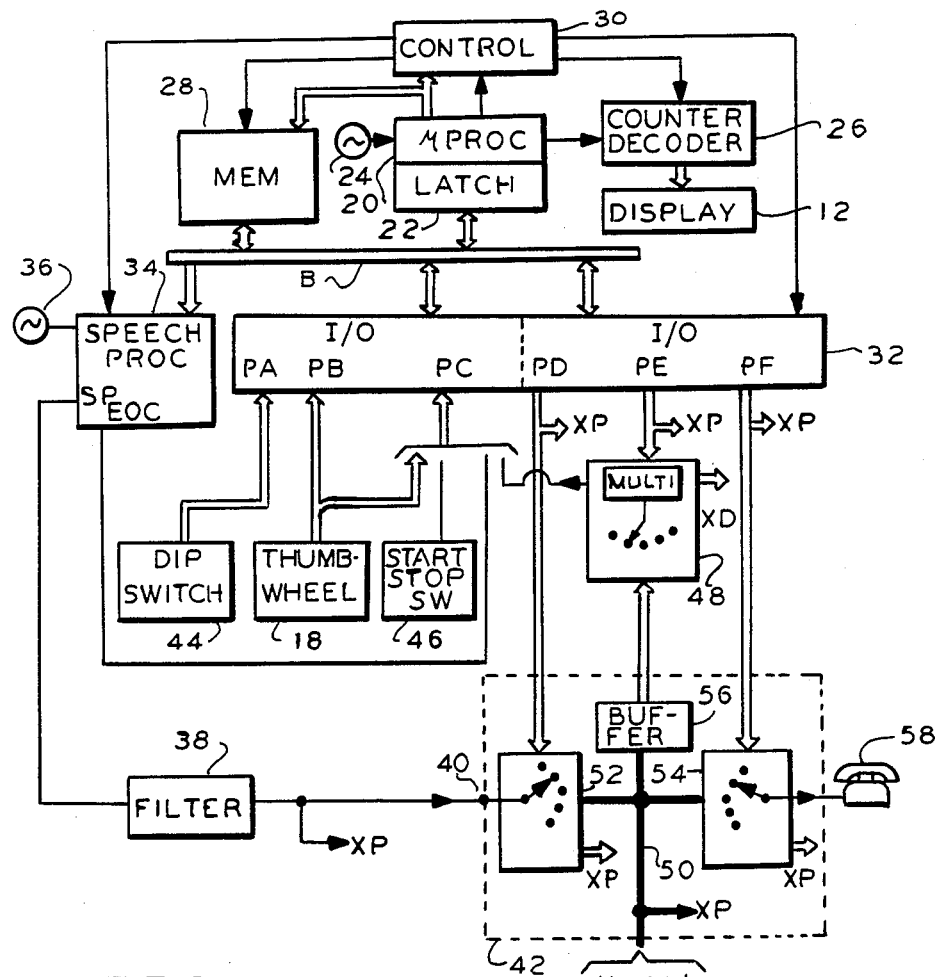
FIG. 2 is a block diagram showing the electronics within the case of the answering device of FIG. 1.

Referring to FIG. 2, a central means is shown herein as microprocessor 20 having associated with it latch 22. In this embodiment microprocessor 20 is a type 8052AH, eight bit microprocessor manufactured by Intel having an internal basic program. Of course, other microprocessor types can be employed instead. Latch 22 is coupled to an eight bit address/data line so that the eight lines associated therewith can be converted into sixteen for addressing purposes. These sixteen bits of information are placed on bus line B. Microprocessor 20 is timed by an oscillator 24 operating at 11.5 MHz, although other frequencies may be employed as well. Microprocessor 20 connects through an output line to counter/decoder 26, which in this embodiment may be a counter type ICM7225 (manufactured by Maxim) together with the four, seven-segment LED displays 12, mentioned previously. Memory 28 may be a conventional EPROM and RAM, preferably totalling 16 kilobytes of memory. The amount of memory can be altered, however, depending upon the type of programming, desired accuracy of the processing, etc.

Bus B also communicates with input/output devices 32. In this embodiment devices 32 are a pair of integrated circuits: circuit type 8255 manufactured by Nationnal Semiconductor, Signetics, Texas Instruments or one of the other well known manufacturers of integrated circuits.

Voice means 34, described hereinafter in further detail, is shown driven by a 4 MHz clock 36. Processor 34, memory 28, counter/decoder 26, and input/output devices 32 all receive enabling inputs from a control means 30. Control means 30 is described hereinafter in further detail. It will be noted, however, that microprocessor 20 provides the input signal to the control means 30.

Speech processor 34 is shown having a speech output line SP connecting through a low pass filter 38 to an input 40 of select means 42. Filter 38 may have a high cutoff in the order of 3 to 4 kHz. Speech processor 34 is also shown with an output EOC to indicate when the speech signal waveform of line SP has finished.

It is noted that terminal 40 is also identified as expansion terminal XP. This is to indicate that this terminal together with other terminals so designated, are provided, as a group, to an expansion device for the purpose of servicing more telephone lines than are described in this specific embodiment.

Input/output devices 32 are shown having six ports PA, PB, PC, PD, PE, and PF. As described hereinafter, the control signal from control means 30 selects which of the ports PA-PF is operational. Port PA is shown connected to a DIP switch 44. This is a miniaturized set of eight rocker switches that can be set to designate the manner in which microprocessor 20 ought to operate. As described hereinafter, switch 44 is read at the beginning of the initializing phase of the program of microprocessor 20. Similarly, the thumbwheel switches 18, (previously described in FIG. 1) provide input to Port PB and Port PC. There are four additional lines in Port PC, three of which are used. One is used by the start/stop switch 46, as described hereinafter in further detail; another by line EOC of speech processor 34; and a third by the multiplexed output line of ring means 48, also described hereinafter in further detail.

Switching matrix 42 is connected to ten pairs of telephone lines 50. These lines are connected in parallel to: multiplexer 52, multiplexer 54 and buffer 56. Multiplexer 52 is shown driven by port PD of device 32 to determine which one of the ten pairs of lines 50 will receive the synthesized speech from terminal 40. Multiplexer 54 is shown driven by port PF to determine which one of the ten pairs of telephone lines 50 will be connected to external telephone set 58.

Telephone lines 50 are also shown connected through buffer 56 to a multiplexer/conditioner 48. Port PE directs device 48 to select one of the buffered telephone lines for conditioning and transmission to a single line of port PC.

Certain lines of ports PD, PE and PF are tapped to be connected in parallel to an expansion device XP (not shown) as mentioned earlier. Similarly, telephone lines 50 are shown connecting to the expansion device XP. Multiplexers 52 and 54 also have control signals that connect to expansion device XP.

Figure 4:
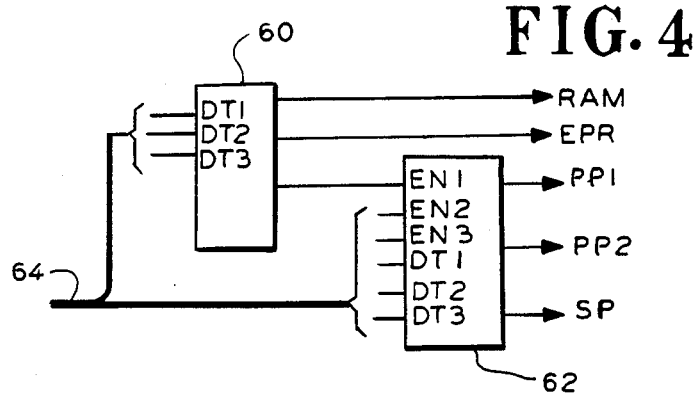
FIG. 4 is a schematic diagram showing in further detail the control circuit of FIG. 2.

Referring to FIG. 4, the previously mentioned controller (control 30 of FIG. 2) is shown herein constructed from a pair of three-to-eight decoders 60 and 62, preferably integrated circuit type 74LS138 manufactured by National Semiconductor, Signetics, Texas Instruments or any one of the other well known manufacturers of integrated circuits. Decoders 60 and 62 each have a trio of binary data inputs DT1, DT2, and DT3. In addition, device 62 employs a trio of enable lines EN1, EN2 and EN3. Devices 60 and 62 are each shown using only three of their eight output lines. Two of the illustrated outputs from device 60 (lines RAM and EPR) are used to enable two different memory devices, namely, the previously mentioned RAM and EPROM devices. A third one of the output lines from decoder 60 is connected to the enable line EN1 of decoder 62. The two other enable lines EN2 and EN3 together with each of the three data lines (lines DT1, DT2, and DT3) from the devices 60 and 62 are bundled to form eight-bit input lines 64. Lines 64 are addressed by the high address lines of the microprocessor (microprocessor 20 of FIG. 2) in the usual fashion. Decoder 62 can strobe three of its eight lines. Lines PP1 and PP2 are used to strobe the pair of output devices previously mentioned (output devices 32 of FIG. 2). Line SP of decoder 62 is used to enable the speech processor (processor 34 of FIG. 2).

Figure 5:
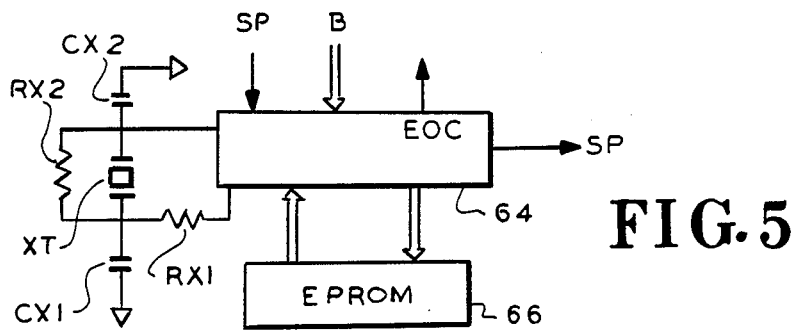
FIG. 5 is a more detailed schematic diagram showing the speech synthesizer of FIG. 2.

Referring to FIG. 5, previously mentioned enable line SP is shown connected to speech processor 64. In this embodiment processor 64 is an integrated circuit type MM54104 manufactured by National Semiconductor. It will appreciated, however, that speech can be synthesized with other equipment. For example, speech can be assembled from standard phonemes to form words. Speech processor 64 is shown connected to previously mentioned bus B and end-of-conversion line EOC. Additionally, processor 64 operates with a pair of EPROM devices 66 programmed by National Semiconductor to allow synthesis of the phrases specified by the original equipment manufacturer. These memories 66 are sold specifically by National Semiconductor to cooperate with the previously mentioned processor 64. Two memory chips 66 are described herein to allow a reasonably complex phrase, but in other embodiments a smaller memory may be used for shorter phrases. A 4 MHz crystal XT is shown serially connected with resistor RX1 between the two clock controlling inputs of processor 64. Connected to opposite terminals of crystal XT are grounding capacitors CX1 and CX2. A damping resistor RX2 is connected in parallel with crystal XT.

Figure 6:
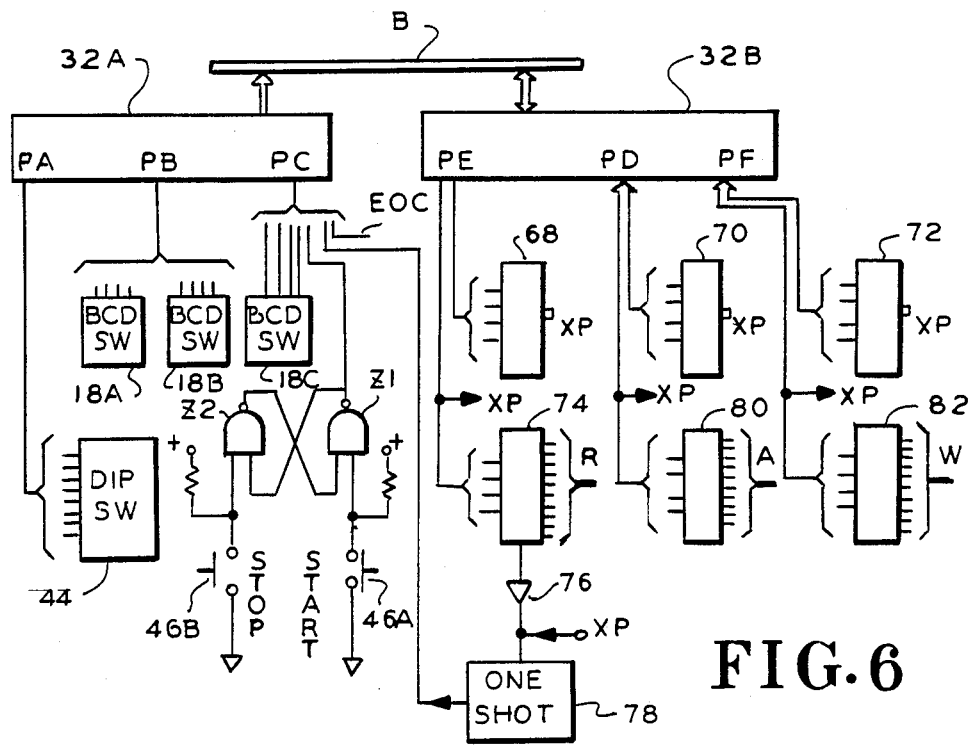
FIG. 6 is a schematic diagram showing in further detail the input/output devices of FIG. 2.

Referring to FIG. 6, the previously mentioned input/output devices (devices 32 of FIG. 2) are shown herein as separate integrated circuits 32A and 32B. Each of these devices may be the integrated circuit type 8255 manufactured by National Semiconductor, Signetics, Texas Instrument et al. As shown herein, previously mentioned port PA is connected to the eight lines of DIP switch 44. Also port PB is connected to two of the thumbwheel switches 18A and 18B previously mentioned in connection with FIG. 1. The other thumbwheel switch 18C has its four lines connected to port PC. Three of the other lines of port PC connect to:

previously mentioned line EOC; the output of one shot multivibrator 78 (detecting means); and the output of NAND gate Z1.

NAND gate Z1 is connected together with NAND gate Z2 (output to input) to form a flip flop. The "non-fed back" input of NAND gate Z1 is connected through start switch 46A to ground. The non-fed back input of NAND gate Z2 is connected to ground through stop switch 46B. In the usual fashion depressing momentary contact switch 46A will set gate Z1 to produce a high output. In a similar fashion, depression of switch 46B will force a high output from gate Z2.

Each of the ports PD, PE, and PF have four of its lines connected to an expansion decoder 68, 70, and 72, respectively. Decoders 68-72 are 4 to 16 decoders with their outputs being of the one-out-of-sixteen type. In this embodiment however, only 10 of the 16 lines are used. In one constructed embodiment, expansion decoders 68-72 were integrated circuit type 74LS154 manufactured by National Semiconductor, Signetics, Texas Instruments or similar manufacturers.

The other four lines of Port PE connect to a multiplexer 74. The four data lines of multiplexer 74 determine which one of the lines R will transmit data to buffer 76, 78. In this embodiment, multiplexer 74 may be an integrated circuit type 74LS150 manufactured by National Semiconductor, Signetics, Texas Instruments or other manufacturers. Multiplexer 74 as described hereinafter transmits to one shot 78 a square wave indicating a ringing signal, to produce a pulse of a minimum duration so that the ringing frequency is converted into a one second pulse.

The non-expansion lines of Port PD are shown connected to a decoder 80 which is identical to decoder 68. As described hereinafter, decoder 80 can select by means of lines A, one of the telephone lines to which a synthesized speech signal may be transmitted. Similarly, the non-expansion lines of port PF connect to the data lines of decoder 82 to select by means of lines W one of the ten telephone lines to be switched to a separate telephone set when a winner is on that line.

Figure 3:
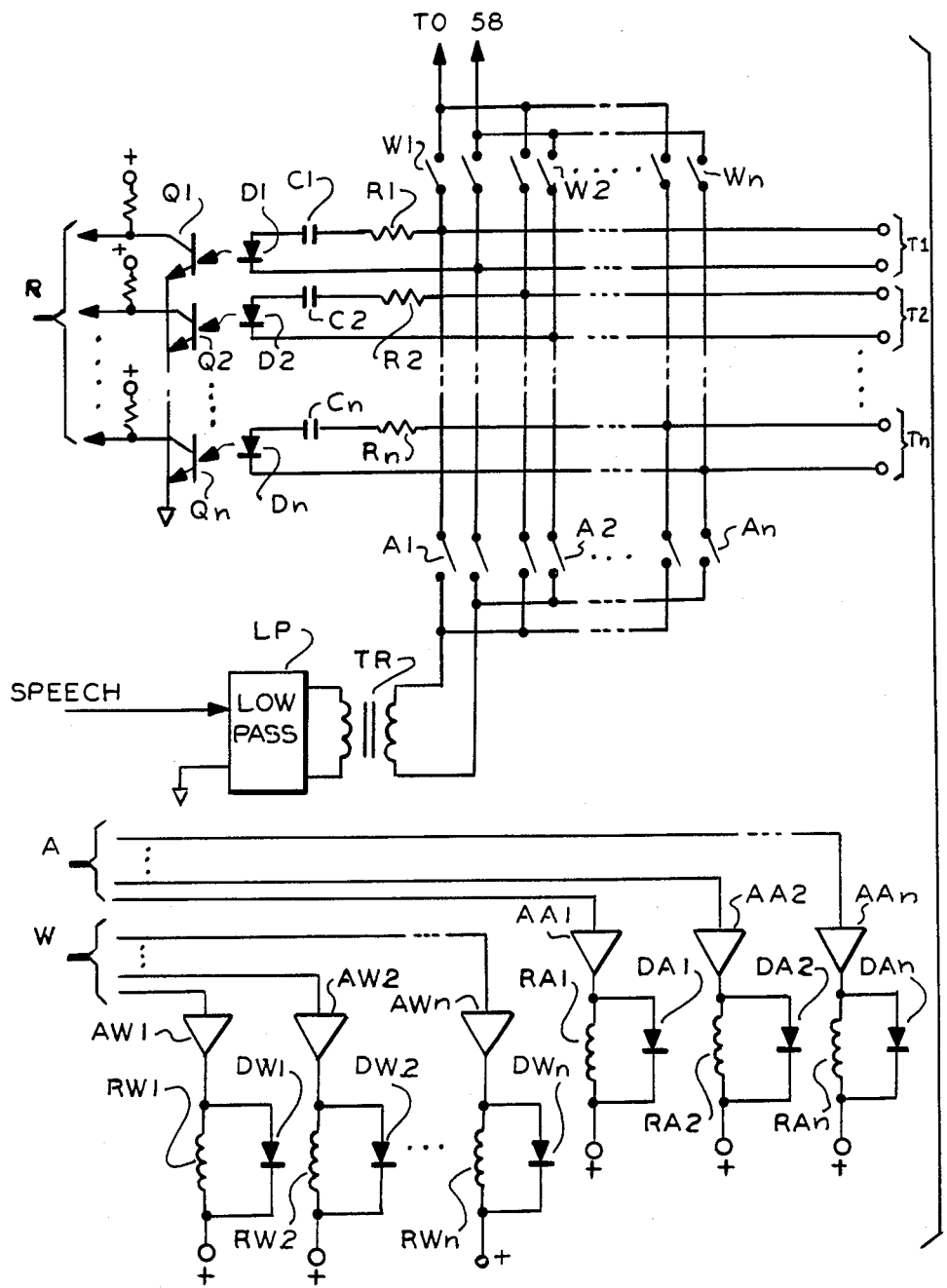
FIG. 3 is a schematic diagram showing the switching matrix of FIG. 2 in further detail.

Referring to FIG. 3, it shows a switching matrix operating on a plurality of pairs of telephone lines T1, T2, ... Tn. Each of the contacts W1-Wn and A1-An are double-pole single-throw contacts that are normally open. Each of the lines T1-Tn connect to an associated pair of relay contact pairs W1, W2, ... Wn, respectively. Each of the relay contacts W1-Wn have their output sides connected in parallel to telephone set 58. Also telephone pairs T1, T2, ... Tn separately connect to relay contact pairs A1, A2, ... An, respectively. The input sides of relay contacts A1-An are connected in parallel to the secondary of transformer TR whose primary is driven by low pass filter LP whose input connects to the speech output of the speech processor (processor 34 of FIG. 2).

Each of the relay contacts W1, W2, ... Wn are driven by an associated relay coil RW1, RW2, ... RWn, respectively. Also relay contacts A1, A2, ... An are driven by relay coils RA1, RA2, ... RAn, respectively. Each of the relay coils DW1, DW2, DWn, RA1, RA2, RAn, have connected in parallel across it shunting diode DW1, DW2, DWn, DA2, DA1, DAn, respectively. The cathodes of each of the diodes are connected to positive potential. The anodes of diodes DW1, DW2, DWn, DA1, DA2, DAn, are connected to the output of buffers AW1, AW2, AWn, AA1, AA2, AAn, respectively. As illustrated, the AW-type of buffers is driven by winner lines W. The AA-type of buffers is driven by answering lines A.

Telephone lines T1, T2, . . . Tn connect across a resistive-capacitive combination of components R1, C1, D1; R2, C2, D2; . . . and Rn, Cn, Dn, respectively. Each of the codes D1, D2, . . . Dn is part of an opto-isolator pair employing photosensitive transistor Q1, Q2, . . . Qn, respectively, whose emitters are grounded and whose biased collectors are bundled into cable R.

To facilitate an understanding of the principles associated with the forgoing apparatus, its operation will now be briefly described in connection with the flowchart of FIG. 7. The apparatus is initially installed by connecting the plurality of telephone lines 50 (FIG. 2) to the rear of the answering device 10 (FIG. 1). Thereafter, DIP switch 44 (FIG. 2) may be set to indicate the number of telephone lines that are in service. In the following example it will be assumed that there are ten such lines in service. Also a conventional telephone set 58 is connected to the device as illustrated in FIG. 2.

After installation, the operator may dial the number of the winning caller into thumbwheel switches 18 (FIG. 1). To commence the contest the operator depresses switch 14 to start microprocessor 20 (FIG. 2). First the microprocessor issues a clear command to counter-decoder 26 to reset the counter to zero. Also at this time the microprocessor issues a command through bus B and input output device 32 to release the relays of switching matrices 52 and 54. Thereafter, microprocessor 20, through its bus B reads the input/output devices 32. Specifically processor 20 reads switches 44, 18 and 46. This is indicated as step ST1 in FIG. 7. From step ST2, it will be appreciated that start/stop switch 46 is regularly read for each programming cycle in case an overriding command to start or stop is being issued.

Having performed these preliminary routines, microprocessor 20 continues to fetch instructions from memory 28 to perform the main program. At this time, microprocessor 20 begins polling the telephone lines 50 by issuing indexing commands to multiplexing device 48 as indicated by step ST3 (FIG. 7). Accordingly, device 32B (FIG. 6) issues the appropriate command through decoder 74 to connect one of the lines R to buffer 76. For example, the first line selected will be the opto-isolator pair Q1 and D1 (FIG. 3). If there is no ringing signal on telephone line T1 then the output of transistor Q1 will remain quiescent. Accordingly, one shot 78 (FIG. 6) will not be triggered and nothing further will happen as shown in step ST4 (FIG. 7). Devices 32B and 74 will next select the second telephone line. Therefore opto-isolator Q2, D2 will be effective (FIG. 3). If there is a ringing signal on telephone lines T2 then a burst of oscillating current will appear on those lines. Accordingly, the alternating current can pass through resistor R2 and capacitor C2 to illuminate light emitting diode D2 and allow transistor Q2 to conduct. This conduction is passed through multiplexer 74 (FIG. 6) and buffer 76. As a result one shot 78 is triggered on the first cycle of each ring burst. Therefore one shot 78 will produce a square wave having a duration approximately equal to the length of each ring, for example, a one second ring. This signal is applied to port PC of input output device 32A. In this fashion microprocessor 20 recognizes that there is a caller on line 2 as suggested by step ST4 (FIG. 7). Assuming the winning count was not reached, the processor 20 transfers control from step ST5 to ST6. Accordingly, microprocessor 20 issues a command through bus B and input/output device 32B to transmit a coded signal on port PD corresponding to the ringing line. Next, decoder 80 (FIG. 6) has its second line in cable A energized. As shown in FIG. 3, this corresponds to a signal being applied through driver AA2 to energize relay coil RA2. In response, relay contacts A2 are closed so that telephone lines T2 connect across the secondary of transformer TR. This provides a sufficient loading on telephone lines T1 so that an answered condition exists on those lines. The computer's next task is to provide synthesized speech through low pass filter LP (FIG. 3) to provide a recorded message to the caller.

Microprocessor 20 (FIG. 2) issues therefore a command through bus B to speech processor 34. As illustrated in FIG. 5, the speech procesor receives its own external 4 MHz clock signal to allow the cycling of speech processor 64. With an enable signal on line SP, the data applied from bus B constitutes the first phrase to be issued by procesor 64. In this instance, the code on bus B corresponds to the phrase "Hello, you are caller number . . . ." Next, processor 64 executes a program contained in memory 66 to cause processor 64 to synthesize a speech waveform on line SP. When that phrase is completed, a signal so indicating is issued on line EOC. As shown in FIG. 2 output line EOC is returned to microprocessor 20 through port PC of input output device 32. Having received acknowledgement that the first phrase was issued, microprocessor 20 now issues a command to recite the number of the caller, in this instance "one." Accordingly, the appropriate enabling signal on bus B commands processor 64 to produce synthesized speech on line SP. Consequently, there is delivered through transformer TR (FIG. 3) synthesized speech that recites in full "Hello you are caller number one." Once this phrase is issued microprocessor 20 receives a signal so indicating on line EOC through port PC. In response, microprocessor 20 issues a command through port PD to, effectively "hang up." Specifically, a command is issued through driver AA2 (FIG. 3) to deactivate relay coil RA2 (flyback diode DA2 preventing transients). Consequently, relay contacts A2 open so that telephone line T2 may be considered "on hook".

In this fashion, each of the telephone lines T1, T2, . . . Tn are answered with a sequentially differing message. For example, the tenth caller will receive the message "Hello you are caller number ten." The indexing upward of callers is indicated also by the counter 26 which receives an indexing signal from microprocessor 20. This causes display 12 to show the number of the caller being answered. It will be appreciated that with a brief message, the various callers can be quickly advised that their call was unsuccessful. Moreover, the process proceeds by answering only those lines that have a ringing current on it.

Assume now that the winning number in thumbwheel switch 18 is 100. When the one hundredth caller is answered we will assume that he is on telephone line T2. The microprocessor 20 internally tracked the number of calls answered and recognizing (in step ST5 of FIG. 7) that the next caller will be the winner now issues a command through port PF when step ST7 transfers control to step ST8. In this instance switching matrix 54 is used for the first time. As shown in FIG. 6, the code issued to decoder 82 energizes the second one of the lines W. As shown in FIG. 3, this signal energizes driver AW2. As a result, relay coil AW2 is activated to close contacts W2. Therefore, telephone lines T2 are now connected directly to lines 58 of a dedicated telephone set.

The net result is that the operator need do nothing but observe the tally increase on display 12 (FIG. 1). When the winning call is reached, telephone set 58 (FIG. 2) will ring in the usual fashion. The operator then can answer telephone set 58 and announce to the caller that he is the winning caller. Telephone line T2 will remain connected to telephone set 58 for the duration of the program as described hereinafter.

Figure 7:
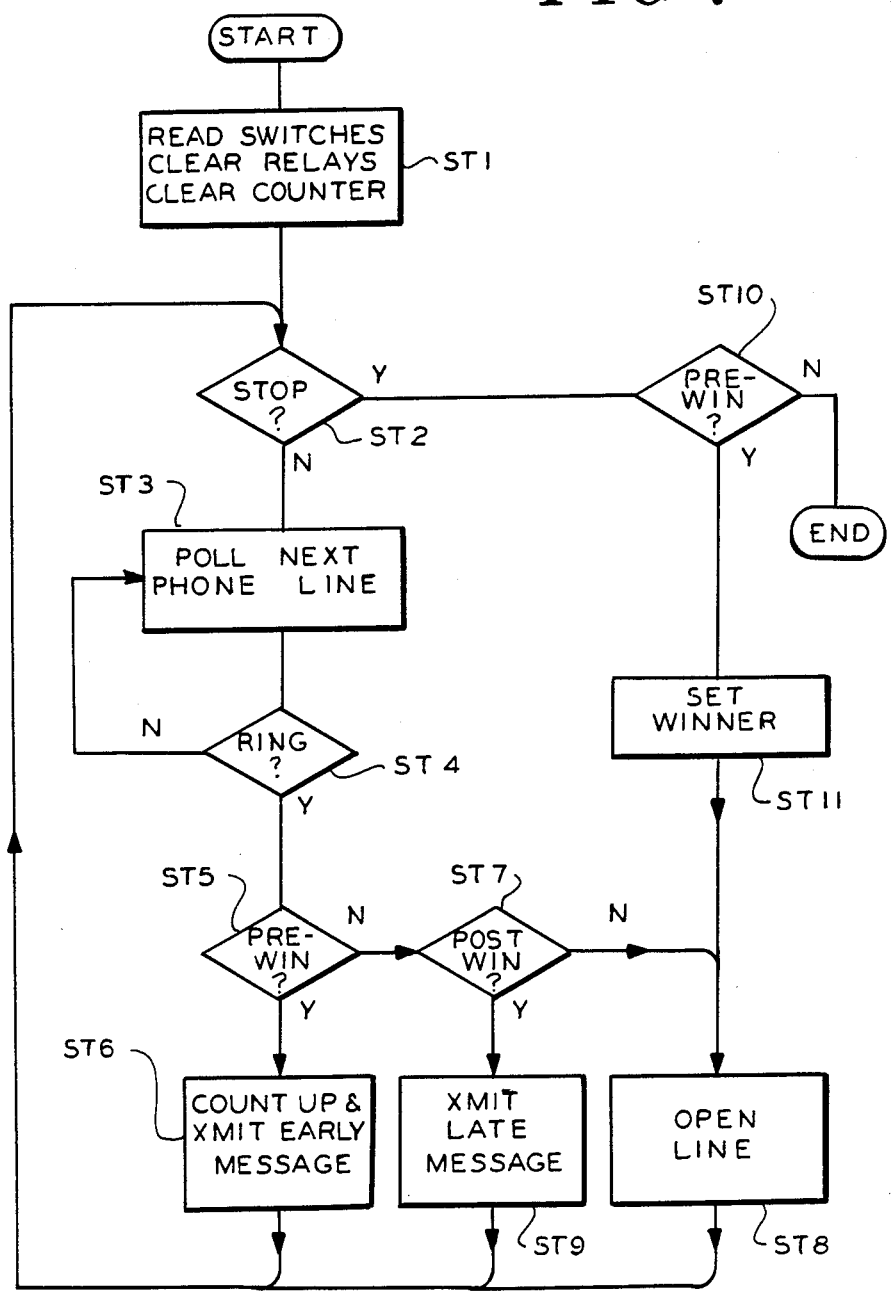
FIG. 7 is a flowchart associated with the programming of the microprocessor of FIG. 2.

The microprocessor 20 will continue to poll telephone lines T1-Tn, skipping the winning telephone line T2 (step ST3 of FIG. 7). The polling proceeds as before with ring detection being accomplished through one shot 78 (FIG. 6) cooperating with the opto-isolators of FIG. 3. When a line is ringing in this instance however, processor 20 issues a different message by transferring control by step ST7 to step ST9 (FIG. 7). Processor 20 will now issue a different code to speech procesor 34. Processor 34 will now recite instead, "sorry, we already have a winner." As the polling continues, the counter and display 26, 12 no longer count up. This polling will continue until stop switch 16 is depressed which depression is sensed through port PC at step ST2.

The foregoing cycle of operation applies in the event that the callers are numerous. However, the operator may wish to terminate the contest early if too few contestants call. In this instance, he may depress stop switch 16, which condition is sensed through port PC. Microprocessor 20 will respond by transferring control from step ST2 to steps ST10 and ST11. As a result the next caller will be declared the winner. Accordingly, the corresponding line will now be routed to telephone set 58 (step ST8 of FIG. 7). Thereafter every other caller will be given the message indicating that a winner has already been selected.

Finally after winner selection, the next depression of the stop button ends the program at step ST10.

It is preferable to have microprocessor 20 and memory 28 store the statistics of each contest. For example, the time of starting, winning and ending, together with the total number of callers may be stored in memory for subsequent printing of a report. Microprocessor 20 has for this purpose a serial data port that can issue such data.

It is to be appreciated that various modifications may be made with respect to the above described preferred embodiment. For example, various microprocessors operating with 8, 16 or other numbers of bits may be employed, instead of processor 20. Also, the amount of memory can be changed depending upon the size and complexity of the program. Also, the number of telephone lines can be increased as suggested by the hardware illustrated for expanding the number of telephone lines. It will be appreciated that other devices for detecting rings and answering the telephone may be substituted for the equipment described herein. Also the processing speeds may be altered depending upon the equipment employed. Also various components may be changed in rating depending upon the desired power capacity, size, speed, temperature stability, etc.

Obviously, many modifications and variations of the present invention are possible in light of the above teachings. It is, therefore, to be understood that within the scope of the appended claims, the invention may be practiced otherwise than as specifically described.

What is claimed is:

1. An answering device for answering callers on at least one telephone line, comprising:
   detector means adapted to be coupled to said telephone line for sensing a new incoming call thereon and providing in response to said incoming calls a ring signal;
   central means coupled to said detector means for providing a command signal varying according to a predetermined sequence, in response to the number of said new incoming call as signified by successive occurrences of said ring signal; and
   voice means coupled to said central means and adapted to be coupled to said telephone line for providing thereon a speech signal waveform in response to said command signal, wherein said speech signal waveform automatically changes according to the number of the new incoming call.

2. An answering device according to claim 1 wherein said voice means is operable to change said speech signal waveform in response to variations in said command signal signifying said new incoming call.

3. An answering device according to claim 2 wherein said central means is operable to produce said command signal to provide said speech signal waveform through said voice means differently for the latest answered ones of said calls than for the first one.

4. An answering device according to claim 2 wherein said central means is operable to detect said ring signal to determine the number of calls received, said voice means being operable to change said speech signal waveform in response to a predetermined number of calls being received.

5. An answering device according to claim 4 wherein said telephone line comprises a plurality of telephone lines, said device further comprising:
   a selection line adapted to be connected to a telephone; and
   a select means connected to said central means, said selection line, and said plurality of telephone lines for connecting one of said plurality of telephone lines to said selection line in response to said command signal.

6. An answering device according to claim 5 wherein said plurality of telephone lines are numbered and renumbered, up to at least said predetermined number, by said central means by the order in which each of said telephone lines receives an incoming call, said central means being operable to connect to said selection line that one of said plurality of telephone lines that is numbered the same as said predetermined number.

7. An answering device according to claim 6 wherein said voice means is operable to change said speech signal waveform to provide a first and second message, said central means being operable to vary said command signal to provide said first message to each of said plurality of telephone lines numbered below said predetermined number, after receipt of said predetermined number of incoming calls said telephone lines receiving said second message.

8. An answering device according to claim 7 wherein said detector includes:
   detecting means coupled to said central means for determining the presence of an incoming call; and
   polling means for successively connecting one of said telephone lines to said detecting means.

9. An answering device according to claim 8 wherein said voice means comprises:
   storage means for digitally storing the elements of said first and second message; and
   synthesizing means coupled to said central means and said storage means for retrieving and processing said elements to synthesize said speech signal waveform in response to said command signal.

10. An answering device according to claim 9 further comprising:
    a selector coupled to said central means for providing a setting signal corresponding to a selected number, said central means being operable to vary said command signal to make the predetermined number said selected number.

11. An answering device according to claim 10 further comprising:
    a multiplexer coupled to said central means, said voice means and said telephone lines for coupling said speech signal waveform to that one of said telephone lines having the highest number determined by said command signal.

12. An answering device according to claim 11 further comprising:
    an interval means coupled to said central means for controlling the operating interval of said central means.

13. An answering device according to claim 12 wherein said interval means comprises:
    a start and stop switch for starting and stopping, respectively, the operation of said central means.

14. An answering device according to claim 13 wherein said central means comprises:
    a digital processing means for providing said command signal; and
    memory means coupled to said processing means for storing data responsive to occurrences of said ring signal, said processing means being operable to retrieve said data.

15. An answering device according to claim 14 wherein said central means further comprises:
    a counter means coupled to said processing means and responsive to a count signal issuing therefrom to record the number of the last incoming call until said predetermined number is reached.

16. An answering device according to claim 14 wherein said polling means comprises:
    a plurality of opto-isolators each connected to said polling means and to a corresponding one of said telephone lines.

* * * * *